(12) United States Patent
Liang

(10) Patent No.: US 11,474,993 B2
(45) Date of Patent: Oct. 18, 2022

(54) METHOD FOR AGGREGATING INFORMATION, ELECTRONIC DEVICE, AND STORAGE MEDIUM

(71) Applicant: BEIJING DAJIA INTERNET INFORMATION TECHNOLOGY CO., LTD., Beijing (CN)

(72) Inventor: Songyu Liang, Beijing (CN)

(73) Assignee: Beijing Daija Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/389,516

(22) Filed: Jul. 30, 2021

(65) Prior Publication Data
US 2022/0067018 A1    Mar. 3, 2022

(30) Foreign Application Priority Data

Sep. 1, 2020 (CN) .......................... 202010905819.8

(51) Int. Cl.
*G06F 7/00* (2006.01)
*G06F 17/00* (2019.01)
*G06F 16/23* (2019.01)

(52) U.S. Cl.
CPC ................ *G06F 16/2358* (2019.01)

(58) Field of Classification Search
None
See application file for complete search history.

(56) References Cited

U.S. PATENT DOCUMENTS

| 2011/0072373 A1* | 3/2011 | Yuki .................... G06F 8/34 715/764 |
| 2012/0178488 A1* | 7/2012 | Jonker .................. H04W 8/005 455/517 |
| 2014/0344257 A1* | 11/2014 | Loredo ................. G06Q 10/10 707/723 |

FOREIGN PATENT DOCUMENTS

| CN | 1859379 A | 11/2006 |
| CN | 103823813 A | 5/2014 |
| CN | 104571916 A | 4/2015 |
| CN | 110032597 A | 7/2019 |
| CN | 111090822 A | 5/2020 |

OTHER PUBLICATIONS

Notice of Allowance for CN application 202010905819.8 with English Translation.
OA for CN application 202010905819.8.
English translation of OA for CN application 202010905819.8.

\* cited by examiner

*Primary Examiner* — Tuan A Pham
(74) *Attorney, Agent, or Firm* — Timothy W. Menasco, Esq.; Harter Secrest & Emery LLP

(57) ABSTRACT

The disclosure can provide a method for aggregating information, and an electronic device, relating to the field of electronic device technologies. The method includes: obtaining first information generated by a current operation on a task; obtaining second information generated by a historical operation on the task; and aggregating and displaying the first information and the second information based on a degree of matching between the first information and the second information.

24 Claims, 7 Drawing Sheets

| | | | |
|---|---|---|---|
|  | Xiaoming | creates the task | July 3, 2019 |
|  | Xiaomei | modifies the priority to P0 | July 03, 2019 |
|  | Xiaomei modifies task title to "new title"  viewing old title | | July 03, 2019 |
| | Xiaomei modifies task description to "the list page only supports expanding one level of subtasks"  viewing old description | | July 03, 2019 |
|  | Xiaomei modifies task title to "new title"  viewing old title | | August 24, 2019 |
| | Xiaomei modifies task description to "the list page only supports expanding one level of subtasks"  viewing old description | | August 24, 2019 |
|  | Xiaoming modifies the priority to P0 | | September 04, 2019 |
| | Xiaoming uploads the attachment  ~~records the screen video~~ | | yesterday 17:29 |
| | Xiaoming completes the task | | yesterday 17:29 |
| | Xiaoming redoes the task | | just now |

FIG. 12

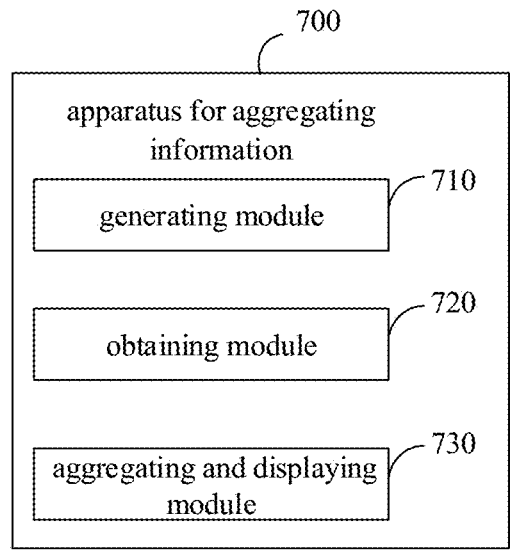

FIG. 13

METHOD FOR AGGREGATING INFORMATION, ELECTRONIC DEVICE, AND STORAGE MEDIUM

CROSS-REFERENCE TO RELATED APPLICATION

This application claims priority to Chinese Patent Application Serial No. 202010905819.8 filed on Sep. 1, 2020, the content of which is hereby incorporated by reference in its entirety into this disclosure.

FIELD

The disclosure relates to the field of electronic device technologies, and more particularly, to a method for aggregating information, an electronic device, and a storage medium.

BACKGROUND

Logs and comments related to each task may be recorded in a corresponding project management tool. The logs and the comments may be usually displayed on different pages of the project management tool. As a result, a user needs to switch the pages back and forth every time when viewing the logs and the comments.

SUMMARY

According to embodiments of the disclosure in a first aspect, a method for aggregating information is provided. The method includes: obtaining first information generated by a current operation on a task; obtaining second information generated by a historical operation on the task; and aggregating and displaying the first information and the second information based on a degree of matching between the first information and the second information.

According to embodiments of the disclosure in a second aspect, an electronic device is provided. The electronic device includes a processor; and a memory for storing instructions executable by the processor. The processor is configured to execute the instructions to: obtain first information generated by a current operation on a task; obtain second information generated by a historical operation on the task; and aggregate and display the first information and the second information based on a degree of matching between the first information and the second information.

According to embodiments of the disclosure in a third aspect, a storage medium is provided. When instructions in the storage medium are executed by a processor of an electronic device, the electronic device is caused to perform: obtaining first information generated by a current operation on a task; obtaining second information generated by a historical operation on the task; and aggregating and displaying the first information and the second information based on a degree of matching between the first information and the second information.

It should be understood that both the foregoing general description and the following detailed description are exemplary and explanatory only and are not restrictive of the disclosure.

BRIEF DESCRIPTION OF THE DRAWINGS

The drawings, which are incorporated in and constitute a part of this specification, illustrate embodiments consistent with the disclosure and, together with the description, serve to explain the principles of the disclosure.

FIG. 12 is a schematic diagram illustrating displaying operation information, according to some embodiments of the disclosure.

FIG. 13 is a block diagram illustrating an apparatus for aggregating information, according to some embodiments of the disclosure.

DETAILED DESCRIPTION

To enable those skilled in the art to better understand technical solutions of the disclosure, technical solutions in embodiments of the disclosure will be described clearly and completely with reference to the drawings.

It should be noted that the terms such as "first" and "second" in the specification and claims of the disclosure and the above-mentioned drawings are used to distinguish similar objects, and not necessarily used to describe a specific order or sequence. It should be understood that the data used in this way may be interchanged under appropriate circumstances so that the embodiments of the disclosure described herein may be implemented in a sequence other than those illustrated or described herein. The implementation manners described in the following embodiments do not represent all implementation manners consistent with the disclosure. Rather, they are merely examples of apparatuses and methods consistent with some aspects of the disclosure as detailed in the appended claims.

Figure 1:
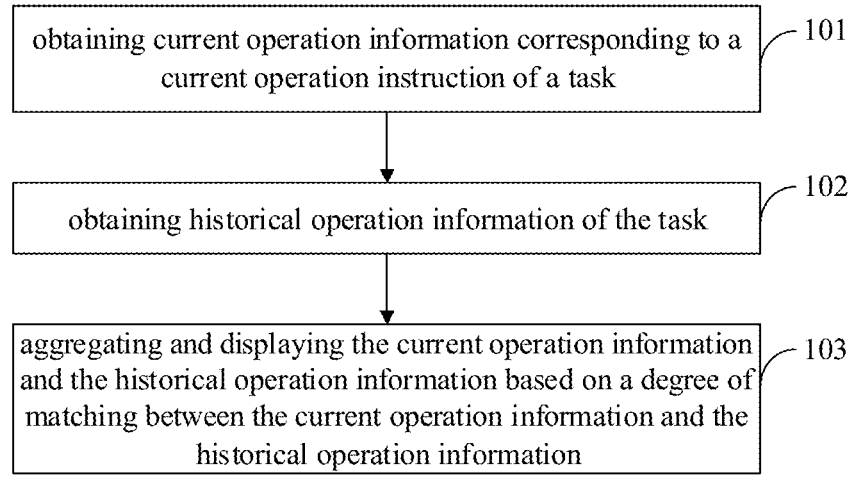
FIG. 1 is a flowchart illustrating a method for aggregating information, according to some embodiments of the disclosure.

FIG. 1 is a flowchart illustrating a method for aggregating information, according to some embodiments of the disclosure. As illustrated in FIG. 1, the method may include the following.

In block 101, current operation information corresponding to a current operation instruction of a task is obtained.

The current operation information may also refer to first information for concise. The first information may be generated by a current operation on a task. The current operation may be an operation by executing the current operation instruction.

The method for aggregating information, according to some embodiments of the disclosure, may be applicable for aggregating operation information related to various tasks in various project management tools. The various project management tools are tools for managing various projects. For a project, the project may be divided into tasks. For example, a project for developing a certain video software may be divided into tasks such as software interface design, coding implementation, and software testing.

When an operator operates any task, an operation instruction of this any task may be obtained and this current operation instruction of the task may be executed. The operation information corresponding to the current operation instruction is generated based on the current operation instruction, which is called as the current operation information.

The current operation information may include at least one of: an operator identifier, an operation object, an operation type, an operation moment, and operation content. The operator identifier may be a name, an avatar, and other information of the operator. The operation object may be a task description, a task priority, a task title, a task deadline, etc. The operation content may refer to content edited or content commented, such as a newly modified task description, a newly modified task title. The operation moment may be a moment when the operator performs the operation or a moment when the operation information is generated.

For example, if operator XX changes the task deadline to August 25 at 19:28, a corresponding log may be generated as "XX modify the deadline to August 25, 19:28". The operator identifier is XX, the operation object is the deadline, the operation moment is 19:28, and the operation content is August 25.

In block 102, historical operation information of the task is obtained.

The historical operation information may also refer to second information for concise. The second information may be generated by a historical operation on a task. The historical operation may be an operation by executing the historical operation instruction.

In some embodiments, the historical operation information of the task is obtained. The historical operation information may refer to one or more of all pieces of historical operation information generated starting from the creation of the task.

It is understandable that the historical operation information also includes at least one of: an operator identifier, an operation object, an operation type, an operation moment, and operation content.

In block 103, the current operation information and the historical operation information are aggregated and displayed based on a degree of matching between the current operation information and the historical operation information.

In the related art, operation information may be displayed on different pages based on types of operation information. When a user browses different types of operation information, he/she may switch the pages back and forth. The operations may be cumbersome and the efficiency of reading information for the user may be reduced.

In some embodiments, the degree of matching between the current operation information and the historical operation information may be determined first, and the current operation information and the historical operation information are aggregated and displayed based on the degree of matching between the current operation information and the historical operation information. In detail, information included in the current operation information may be matched with information included in the historical operation information, and the current operation information and the historical operation information are aggregated and displayed based on a matching result.

For example, if the operator identifier of the current operation information is the same as the operator identifiers of all historical operation information, that is, the historical operation information and the current operation information are the same operator, the current operation information and the historical operation information are aggregated and displayed. When displaying the operation information of the task, the current operation information and the historical operation information are displayed in a time order of operation moments, in which, a piece of the oldest historical operation information is displayed in a default character size, and other historical operation information and the current operation information are displayed in a reduced character size.

In some embodiments, the current operation information and the historical operation information are aggregated and displayed based on the degree of matching between the current operation information and the historical operation information, so that the historical operation information and the current operation information are aggregated for display.

In some embodiments, the operation information may be operation log information or comment information posted by the user.

In some embodiments of the disclosure, the current operation instruction for any task may be executed and the current operation information corresponding to the operation instruction is generated. The historical operation information of any task is obtained. The current operation information and the historical operation information are aggregated and displayed based on the degree of matching between the current operation information and the historical operation information. As a result, the current operation information and the historical operation information are aggregated and displayed based on the degree of matching between the current operation information and the historical operation information, so that the current operation information and historical operation information of the task are aggregated for display. When the user is viewing the operation information of the task, there is no need to switch pages back and forth, which improves the efficiency of reading operation information.

In some embodiments of the disclosure, the aggregating and displaying modes of the current operation information and historical operation information may vary with the degrees of matching between the current operation information and the historical operation information. In detail, the degree of matching may be determined through matching various information in the operation information.

In practical applications, the operator may perform consecutive operations on the task, thereby generating pieces of operation information that are consecutive. In some embodiments of the disclosure, the degree of matching between the current operation information and the historical operation information may be determined through matching the operator identifiers. When the operator identifier of the current operation information is the same as the operator identifier of the historical operation information, it is considered that the current operation information and the historical operation information satisfy a basic matching condition and the degree of matching is ordinary. In detail, the obtained historical operation information is previous operation information corresponding to a previous operation instruction. If the operator identifier of the previous operation information is the same as the operator identifier of the current operation information, the current operation information and the previous operation information are aggregated and displayed.

The previous operation instruction refers to a received operation instruction most recent with the current operation instruction, and the previous operation information is operation information generated by executing the previous operation instruction. That is, the previous operation information is historical operation information which has the operation moment most recent with the operation moment of the current operation information.

In other words, when the operator identifier of the previous operation information is the same as the operator identifier of the current operation information, the current operation information and the previous operation information are aggregated and displayed. For example, when the current operation information and the historical operation information are aggregated and displayed, the operator identifier of the current operation information is hidden, or a color of characters in the current operation information is adjusted.

In some embodiments of the disclosure, the historical operation information is the previous operation information corresponding to the previous operation instruction. When aggregating and displaying the current operation information and the historical operation information based on the degree of matching between the current operation information and the historical operation information, the current operation information and the previous operation information are aggregated and displayed if the operator identifier of the previous operation information is the same as the operator identifier of the current operation information. Therefore, when the operator of the current operation information is the same as the operator of the previous operation information, the current operation information and the previous operation information are aggregated and displayed, so that the two pieces of operation information of the same operator are aggregated and displayed, which improves the efficiency of reading operation information.

In practical applications, the operation information of the task is saved in real time, for example, if the operator modifies the task description, the saving may be triggered every a certain duration and a piece of operation information may be recorded accordingly. If the operator consecutively modifies the task description, pieces of operation information are recorded, which are redundancy. Based on this, in some embodiments of the disclosure, if the operator identifier of the previous operation information is the same as the operator identifier of the current operation information, the current operation information and the historical operation information may be aggregated and displayed based on operation types and operation objects. The following may describe with reference to FIG. 2, which is a flowchart illustrating a method for aggregating information, according to some embodiments of the disclosure.

Figure 2:
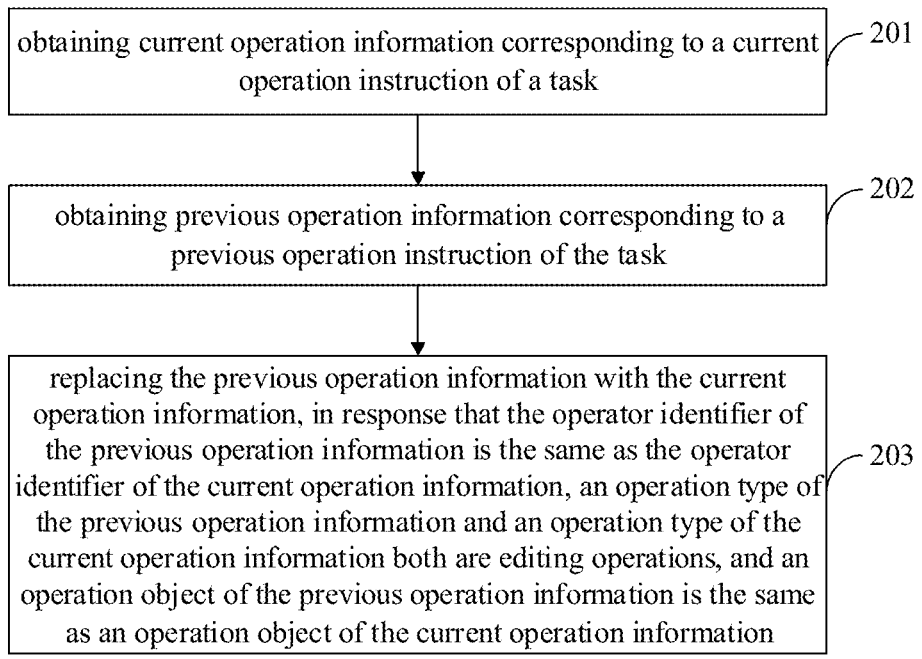
FIG. 2 is a flowchart illustrating a method for aggregating information, according to some embodiments of the disclosure.

As illustrated in FIG. 2, the method includes the following.

In block 201, current operation information corresponding to a current operation instruction of a task is obtained.

In some embodiments, the action in block 201 is similar to the action in block 101 described above, so it will not be repeated herein.

In block 202, previous operation information corresponding to a previous operation instruction of the task is obtained.

In some embodiments, the previous operation information corresponding to the previous operation instruction of the task may be obtained based on the corresponding operation moment from various pieces of historical operation information. The previous operation information is historical operation information which has the operation moment most recent with the operation moment of the current operation information, that is, the previous operation information is historical operation information with the latest operation moment.

In block 203, the previous operation information is replaced with the current operation information, in response that the operator identifier of the previous operation information is the same as the operator identifier of the current operation information, an operation type of the previous operation information and an operation type of the current operation information both are editing operations, and an operation object of the previous operation information is the same as an operation object of the current operation information.

In some embodiments, when the operation type of the current operation information is the editing operation, the generated operation information is a log for the editing operation. The editing operation refers to an operation for editing fields of the task. For example, modifying the task description, modifying a deadline log of the task, and the like belong to the editing operations. In some embodiments, the current operation information matches the previous operation information in various information. At this time, it is considered that the degree of matching is very high. The two pieces of operation information may be redundant operation information, and the newest operation information is recorded only. Therefore, the current operation information may be used to replace the previous operation information.

After obtaining the previous operation information, the operator identifier, the operation type, and the operation object in the current operation information may be respectively compared with the operator identifier, the operation type, and the operation object in the previous operation information. When the operator identifier of the current operation information is the same as the operator identifier of the previous operation information, the operation type of the current operation information and the operation type of the previous operation information are both the editing operations, and the operation object of the current operation information is the same as the operation object of the previous operation information, the previous operation information is replaced with the current operation information, that is, the current operation information is used to replace the previous operation information.

For example, if an operator modifies the task description at 8:35, and later, this operator modifies the task description again at 9:30, the operation information generated by the operation executed at 9:30 may be used to replace the operation information generated by the operation executed at 8:35.

In practical applications, when an operator performs the same editing operation consecutively on the task twice, and there is no other operator to operate the task between the two editing operations, the operation information with a later operation moment in the two pieces of operation information that are consecutive is used to replace the previous operation information with an earlier operation moment. For example, the operation information of a task may be as follows in a time order of operation moments: (1) Xiaochen modified field A of the task to a high priority, Jun. 3, 2019; (2) Xiaochen modified the task description, Jun. 5, 2019; (3) Xiaochen modified field B of the task, Jun. 25, 2019; (4) Xiaochen modified field A to a medium priority, Jun. 26, 2019. The operation information (4) may be used to replace the operation information (1).

In some embodiments of the disclosure, when aggregating and displaying the current operation information and the previous operation information in response that the operator identifier of the previous operation information is the same as the operator identifier of the current operation information, the previous operation information is replaced with the current operation information when the operator identifier of the previous operation information is the same as the operator identifier of the current operation information, the operation type of the previous operation information and the operation type of the current operation information both are the editing operations, and the operation object of the previous operation information is the same as the operation object of the current operation information. Therefore, if the operation type of the current operation information is the editing operation, and when the operation type, operation object, and operator of the current operation information are the same as the operation type, operation object, and operator of the previous operation information, the previous operation information may be overwritten with the current operation information. Thus, logs of the editing operations of the same operator consecutively on the same operation object are merged, effectively reducing the generation of redundant logs.

In practical applications, each piece of operation information occupies a relatively large space in a page. If an operator performs operations on the task consecutively, a lot of pieces of operation information may be generated and occupy the more space. Based on this, in some embodiments of the disclosure, if the operator identifier of the previous operation information is the same as the operator identifier of the current operation information, the current operation information and the historical operation information may be aggregated and displayed based on operation types and operation objects. The following may describe with reference to FIG. 3, which is a flowchart illustrating a method for aggregating information, according to some embodiments of the disclosure.

Figure 3:
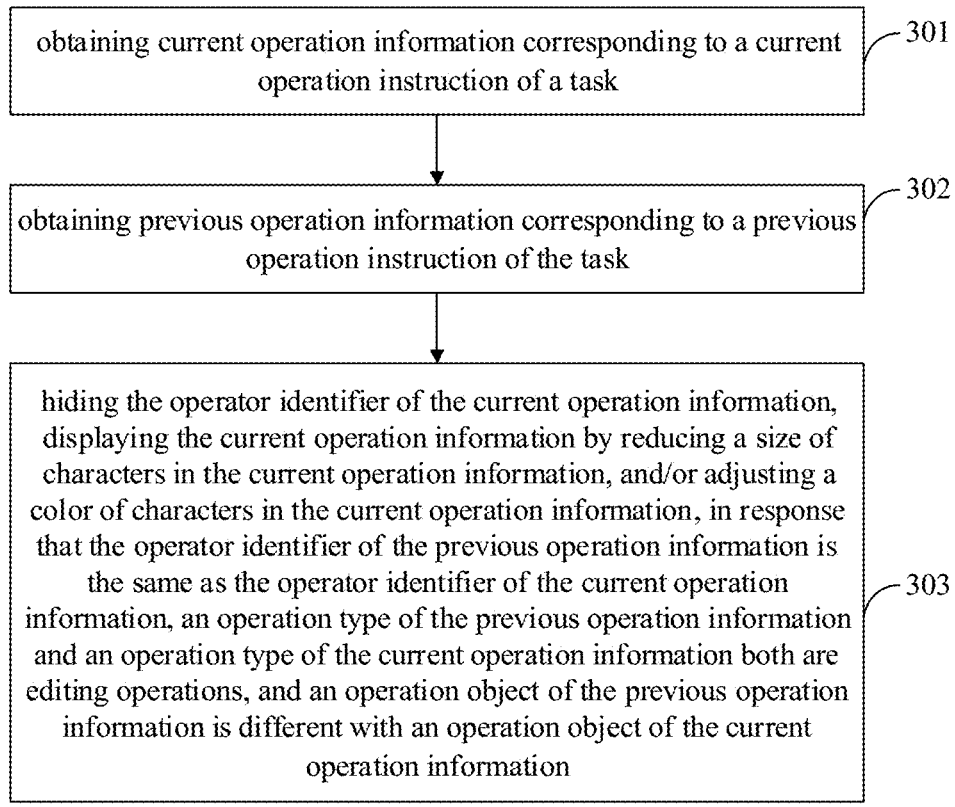
FIG. 3 is a flowchart illustrating a method for aggregating information, according to some embodiments of the disclosure.

As illustrated in FIG. 3, the method includes the following.

In block 301, current operation information corresponding to a current operation instruction of a task is obtained.

In some embodiments, the action in block 301 is similar to the action in block 101 described above, so it will not be repeated herein.

In block 302, previous operation information corresponding to a previous operation instruction of the task is obtained.

In some embodiments, the previous operation information corresponding to the previous operation instruction of the task may be obtained based on the corresponding operation moment from various pieces of historical operation information. The previous operation information is historical operation information which has the operation moment most recent with the operation moment of the current operation information, that is, the previous operation information is historical operation information with the latest operation moment.

In block 303, the operator identifier of the current operation information is hidden, the current operation information is displayed by reducing a size of characters in the current operation information, and/or a color of characters in the current operation information is adjusted, in response that the operator identifier of the previous operation information is the same as the operator identifier of the current operation information, an operation type of the previous operation information and an operation type of the current operation information both are editing operations, and an operation object of the previous operation information is different with an operation object of the current operation information.

In some embodiments, the current operation information matches the previous operation information in the most information. At this time, it is considered that the degree of matching is relatively high. The two pieces of operation information may be aggregated and displayed.

In some embodiments, after obtaining the previous operation information, the operator identifier, the operation type, and the operation object in the current operation information are respectively compared with the operator identifier, the operation type, and the operation object in the previous operation information. When the operator identifier of the current operation information is the same as the operator identifier of the previous operation information, the operation type of the current operation information and the operation type of the previous operation information are both the editing operations, and the operation object of the current operation information is different with the operation object of the previous operation information, at least one of: hiding the operator identifier of the current operation information, displaying the current operation information by reducing a size of characters in the current operation information, and/or adjusting a color of characters in the current operation information, may be selected to be operated.

That is, when the operator of the current operation information is the same as the operator of the latest historical operation information, the operation types of the current operation information and the latest historical operation information both are the editing operations, and the operation object of the current operation information is different with the operation object of the latest historical operation information, at least one of: hiding the operator identifier of the current operation information, displaying the current operation information by reducing a size of characters in the current operation information, and/or adjusting a color of characters in the current operation information, may be selected to be operated.

In some embodiments, hiding the name or avatar of the operator of the current operation information and reducing and displaying the characters in the current operation information, may reduce the space occupation of the operation information on the page. Adjusting the color of the characters in the current operation information such as adjusting the color to a gray, may facilitate the operator to determine that the current operation information and the latest historical operation information are the same operator.

Figure 4:
FIG. 4 is a schematic diagram illustrating displaying operation information, according to some embodiments of the disclosure.

FIG. 4 is a schematic diagram illustrating displaying operation information, according to some embodiments of the disclosure. In FIG. 4, the piece of earliest historical operation information shows the avatar of operator "Xiaoming", while other three pieces of operation information hide the avatar of operator "Xiaoming", and characters in these three pieces of operation information are displayed in a reduced size.

In some embodiments of the disclosure, when aggregating and displaying the current operation information and the previous operation information in response that the operator identifier of the previous operation information is the same as the operator identifier of the current operation information, the operator identifier of the current operation information is hidden, the current operation information is displayed by reducing the size of characters in the current operation information, and/or the color of characters in the current operation information is adjusted, in response that the operator identifier of the previous operation information is the same as the operator identifier of the current operation information, an operation type of the previous operation information and an operation type of the current operation information both are editing operations, and an operation object of the previous operation information is different with an operation object of the current operation information. Therefore, when the operator of the current operation information is the same as the operator of the latest historical operation information, the operation types of the current operation information and the latest historical operation information are both the editing operations, and the operation objects of the current operation information and the latest historical operation information are different, the operator identifier of the current operation information is hidden, the current operation information is displayed by reducing the size of characters in the current operation information, the color of characters in the current operation information is adjusted, and the like. Thus, the operation information generated when the same operator consecutively performs different editing operations may be merged, thereby improving the space utilization of the page.

Figure 5:
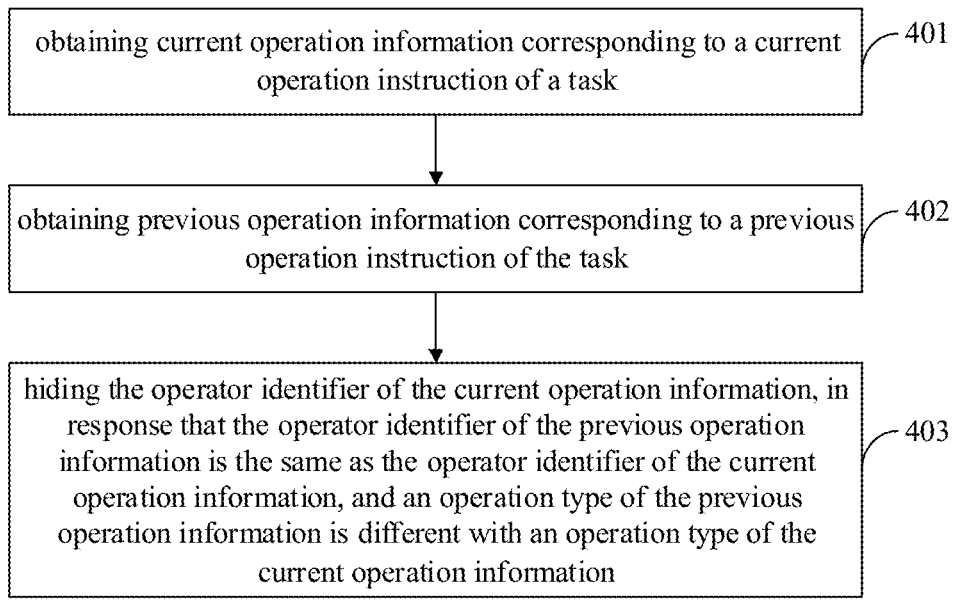
FIG. 5 is a flowchart illustrating a method for aggregating information, according to some embodiments of the disclosure.

In practical applications, the operation types performed consecutively by the same operator twice may be different. In this case, the method in FIG. 5 may be used to aggregate the previous operation information and the current operation information. FIG. 5 is a flowchart illustrating a method for aggregating information, according to some embodiments of the disclosure.

As illustrated in FIG. 5, the method includes the following.

In block 401, current operation information corresponding to a current operation instruction of a task is obtained.

In block 402, previous operation information corresponding to a previous operation instruction of the task is obtained.

In some embodiments, the actions in blocks 401 and 402 are similar to the above described, so it will not be repeated herein.

In block 403, the operator identifier of the current operation information is hidden, in response that the operator identifier of the previous operation information is the same as the operator identifier of the current operation information, and an operation type of the previous operation information is different with an operation type of the current operation information.

In some embodiments, if the operator identifier of the current operation information is the same as the operator identifier of the previous operation information, that is, the previous operation information and the current operation information are the same operator, and the operation type of the current operation information and the operation type of the previous operation information are different, the operator identifier of the current operation information is hidden.

For example, if the operation type of the previous operation information is an editing operation, and the operation type of the current operation information is a comment operation, and the operator of the two pieces of operation information is the same, the operation information may be displayed in a time order of operation moments when the information is aggregated and displayed, and the avatar of the operator of the current operation information is hidden, or the avatar and name of the operator is hidden.

For another example, if the operation type of the previous operation information is a comment operation, and the operation type of the current operation information is an editing operation, and the operator of the two pieces of operation information is the same, the operation information may be displayed in a time order of operation moments when the information is aggregated and displayed, and the avatar of the operator of the current operation information is hidden, or the avatar and name of the operator is hidden.

In some embodiments of the disclosure, when aggregating and displaying the current operation information and the previous operation information in response that the operator identifier of the previous operation information is the same as the operator identifier of the current operation information, the operator identifier of the current operation information is hidden, in response that the operator identifier of the previous operation information is the same as the operator identifier of the current operation information, and an operation type of the previous operation information is different with an operation type of the current operation information, thereby improving the space utilization of the page.

Figure 6:
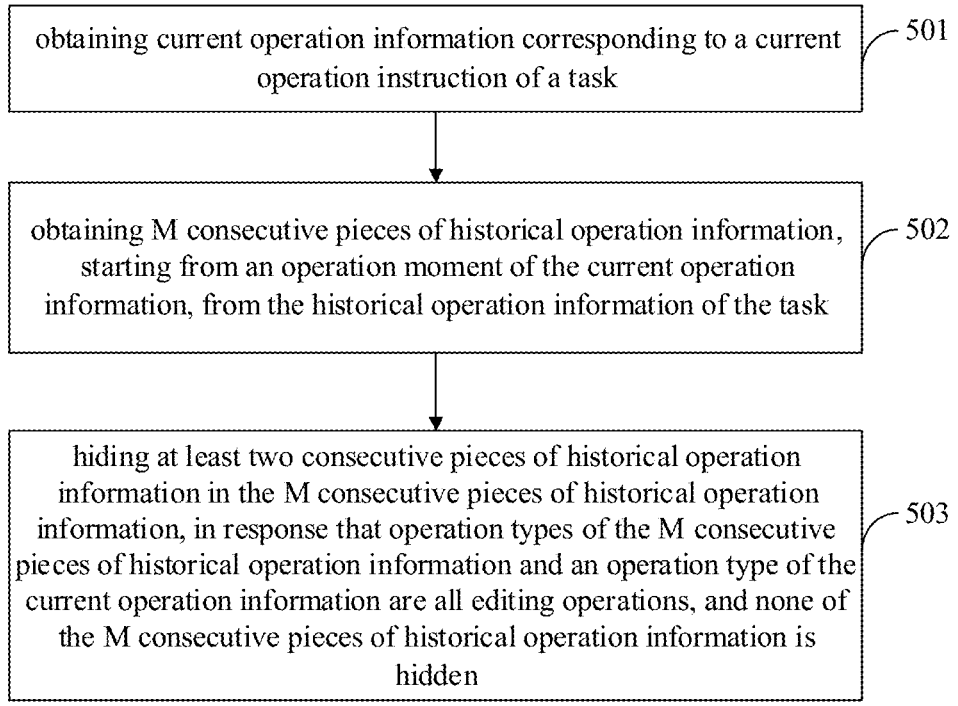
FIG. 6 is a flowchart illustrating a method for aggregating information, according to some embodiments of the disclosure.

In practical applications, during the entire life cycle of the task, there may be a large amount of operation information, which may occupy the more space of the page. Based on this, in some embodiments of the disclosure, if the operation type of the current operation information indicates that the current operation instruction is an editing operation, the current operation information and the historical operation information may also be aggregated and displayed through the method in FIG. 6. FIG. 6 is a flowchart illustrating a method for aggregating information, according to some embodiments of the disclosure.

As illustrated in FIG. 6, the method includes the following.

In block 501, current operation information corresponding to a current operation instruction of a task is obtained.

In some embodiments, the action in block 501 is similar to the action in block 101, so it will not be repeated herein.

In block 502, M consecutive pieces of historical operation information, starting from an operation moment of the current operation information, are obtained from the historical operation information of the task, where M is a positive integer greater than or equal to 2.

In some embodiments, starting from the operation moment of the current operation information, the first M pieces of historical operation information that are consecutive may be obtained from the historical operation information of the task. That is, the first M pieces of historical operation information that are consecutive and closest to the operation moment of the current operation information are obtained, where M is a positive integer greater than or equal to 2.

In block 503, at least two consecutive pieces of historical operation information in the M consecutive pieces of historical operation information, are hidden, in response that operation types of the M consecutive pieces of historical operation information and an operation type of the current operation information are all editing operations, and none of the M consecutive pieces of historical operation information is hidden.

In some embodiments, after obtaining the first M pieces of historical operation information that are consecutive, the operation types of the first M pieces of historical operation information that are consecutive and the operation type of the current operation information may be determined, and it is determined whether the first M pieces of historical operation information that are consecutive are hidden. When the operation types of the first M pieces of historical operation information that are consecutive and the current operation information are all the editing operations, and none of the first M pieces of historical operation information is hidden, the at least two pieces of historical operation information that are consecutive in the M pieces of historical operation information, are hidden.

For example, two consecutive pieces of historical operation information previous to the current operation information may be obtained. If the two consecutive pieces of historical operation information and the current operation information are all editing operations, and none of the two consecutive pieces of historical operation information is hidden, the two consecutive pieces of historical operation information may be hidden.

For example, three consecutive pieces of historical operation information previous to the current operation information may be obtained. If the three consecutive pieces of historical operation information and the current operation information are all editing operations, and none of the three consecutive pieces of historical operation information is hidden, the two pieces of historical operation information with the later time may be hidden in the reverse time order of operation moments, or the two pieces of historical operation information with the earlier time may be hidden. Of course, all three pieces of historical operation information may also be hidden.

In some embodiments, when the M consecutive pieces of historical operation information are hidden, a first preset scaling/expanding control may be used to replace the at least two hidden pieces of historical operation information that are consecutive.

The first preset scaling/expanding control is used to hide or expand the at least two consecutive pieces of historical operation information among the M consecutive pieces of historical operation information.

When displaying, for the hidden historical operation information, "display N pieces of operation information that are earlier" may be displayed, where N is an integer equal to or greater than 2.

Figure 7:
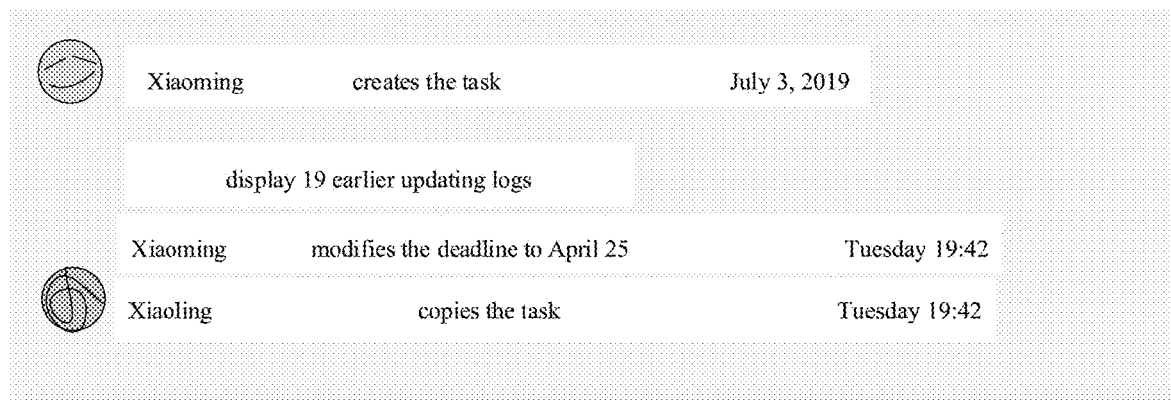
FIG. 7 is a schematic diagram illustrating displaying operation information, according to some embodiments of the disclosure.

FIG. 7 is a schematic diagram illustrating displaying operation information, according to some embodiments of the disclosure. In FIG. 7, the earliest log "Xiaoming creates the task Jul. 3, 2019", and the latest two logs "Xiaoming modifies the deadline to April 25 Tuesday 19:42", and "Xiaoling copies the task Tuesday 19:42", are displayed, and 9 hidden logs are displayed as "display 19 earlier updating logs".

In some embodiments of the disclosure, the operation type of the current operation information indicates that the current operation is the editing operation. When obtaining the historical operation information of the task, M consecutive pieces of historical operation information, starting from an operation moment of the current operation information, are obtained from the historical operation information of the task. When aggregating and displaying the current operation information and the historical operation information based on the degree of matching between the current operation information and the historical operation information, the at least two consecutive pieces of historical operation information in the M consecutive pieces of historical operation information, are hidden, in response that the operation types of the M consecutive pieces of historical operation information and the operation type of the current operation information are all editing operations, and none of the M consecutive pieces of historical operation information is hidden. Therefore, when the operation types of the M consecutive pieces of historical operation information and the operation type of the current operation information are all editing operations, and none of the M consecutive pieces of historical operation information is hidden, a part of the first M pieces of historical operation information, which are consecutive, may be hidden and a remaining part of operation information is displayed only, thereby improving the space utilization of the page.

In some embodiments of the disclosure, after hiding the at least two consecutive pieces of historical operation information in the above-mentioned M consecutive pieces of historical operation information, if the operator triggers the first preset scaling/expanding control on the page for displaying operation information of the task, a display instruction for displaying hidden information may be monitored at this time. For the convenience of description, it is called the first display instruction herein. When the first display instruction for displaying hidden information is monitored on the page for displaying operation information of the task, the at least two consecutive pieces of historical operation information that are hidden are displayed.

For example, in FIG. 7, when an operator triggers "display 19 earlier updating logs", the page may display 19 hidden updating logs.

In some embodiments of the disclosure, after hiding the at least two consecutive pieces of historical operation information in the M consecutive pieces of historical operation information, the at least two consecutive pieces of historical operation information that are hidden may be displayed, in response to monitoring the first display instruction for displaying hidden information on the page for displaying operation information of the task. In this way, the hidden historical operation information may be expanded and displayed through the display instruction, so that the space utilization rate of the page is improved, while the user's viewing of the hidden historical operation information is not affected.

In practical applications, there may be hidden historical operation information among the M consecutive pieces of historical operation information. In order to improve the space utilization rate of the page, in some embodiments of the disclosure, after the M consecutive pieces of historical operation information previous to the current operation information are obtained, the operation types of the M consecutive pieces of historical operation information and the current operation information are determined and the display states of the M consecutive pieces of historical operation information are determined. The display state may be indicated by a state identifier, for example, 0 means a normal display state, and 1 means a hidden state.

A piece of historical operation information next to at least one piece of historical operation information whose display state is a hidden state, is hidden, in response that the operation types of the M consecutive pieces of historical operation information and the operation type of the current operation information are all editing operations, and the M consecutive pieces of historical operation information at least include the at least one piece of historical operation information whose display state is the hidden state.

Since the M consecutive pieces of historical operation information at least include the at least one piece of historical operation information whose display state is the hidden state, and the operation types of the M consecutive pieces of historical operation information and the operation type of the current operation information are all editing operations, it indicates that the historical operation information previously adjacent to the historical operation information whose display state is the hidden state may also be the editing operation, so that the piece of historical operation information next to the at least one piece of historical operation information whose display state is the hidden state may be hidden.

For example, the two pieces of historical operation information previous to the current operation information may be obtained. If the two pieces of historical operation information and the current operation information are all editing operations, and one piece of historical operation information with the earlier operation moment in the two pieces of historical operation information is in the hidden state, it indicates that one piece of historical operation information or several pieces of historical operation information previous to the historical operation information with the earlier operation moment may also be the editing operation, the historical operation information next to the hidden historical operation information may be hidden, that is, the historical operation information that is later in the two pieces of historical operation information may be displayed, and the current operation information may be displayed, and a number of pieces of hidden information in the first preset scaling/expanding control may be increased by one.

In some embodiments of the disclosure, the operation type of the current operation information indicates that the current operation is the editing operation. When aggregating and displaying the current operation information and the historical operation information based on the degree of matching between the current operation information and the historical operation information, the piece of historical operation information next to the at least one piece of historical operation information whose display state is the hidden state, is hidden, in response that the operation types of the M consecutive pieces of historical operation information and the operation type of the current operation information are all editing operations, and the M consecutive pieces of historical operation information at least include the at least one piece of historical operation information whose display state is the hidden state. Therefore, when there is hidden historical operation information in the M consecutive pieces of historical operation information, the historical operation information next to the hidden historical operation information may be hidden, thereby reducing the space occupation of the page and improving the space utilization rate of the page.

When hiding the historical operation information, if there is a comment operation or other operations in the historical operation information, hiding the corresponding operation information may make it easy for the operator to miss important information. Based on this, in some embodiment of the disclosure, if the operation type of at least one piece of historical operation information in the M consecutive pieces of historical operation information is different from the operation type of the current operation information, that is, there is operation information whose operation type is not the editing operation in the M consecutive pieces of historical operation information, for example, if there is a comment operation, the historical operation information and the current operation information may be displayed in a time order of operation moments.

When the historical operation information and the current operation information are aggregated and displayed, all the historical operation information of the task and the current operation information are displayed in the time order of operation moments. For example, the operation information is displayed in the time order of operation moments on the display page from bottom to bottom.

Figure 8:
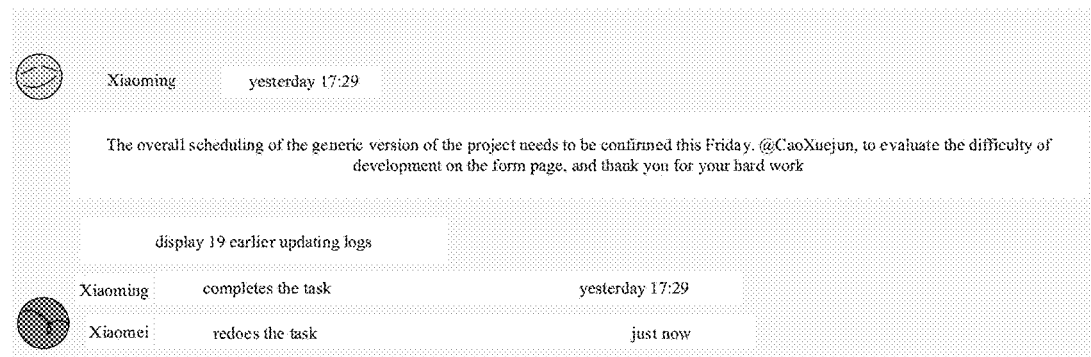
FIG. 8 is a schematic diagram illustrating displaying operation information, according to some embodiments of the disclosure.

FIG. 8 is a schematic diagram illustrating displaying operation information, according to some embodiments of the disclosure. The first historical operation information in FIG. 8 is a comment. The subsequent 19 logs satisfy the hiding conditions to be hidden, displayed as "display 19 earlier updating logs". The latest two pieces of operation information may be displayed.

In some embodiments of the disclosure, the operation type of the current operation information is the editing operation. When aggregating and displaying the current operation information and the historical operation information based on the degree of matching between the current operation information and the historical operation information, the historical operation information and the current operation information may be displayed in the time order of operation moments, in response that the operation type of the at least one piece of historical operation information in the M consecutive pieces of historical operation information is different from the operation type of the current operation information. Therefore, when there is historical operation information whose operation type is not the editing operation in the M consecutive pieces of historical operation information, the historical operation information and the current operation information may be displayed in the time order of operation moments, thereby avoiding the missing of important operation information of the task. For example, comments are hidden, causing the operator to miss important content.

Figure 9:
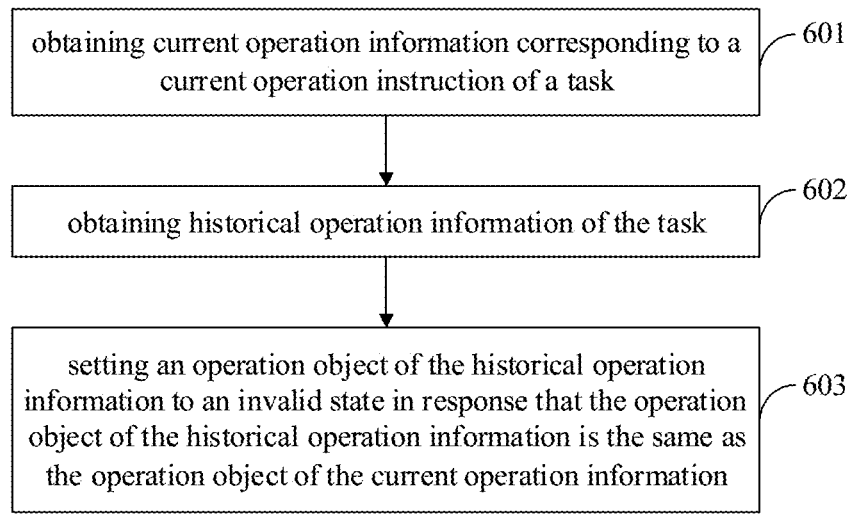
FIG. 9 is a flowchart illustrating a method for aggregating information, according to some embodiments of the disclosure.

In practical applications, through the project management work, the operator may also delete operation objects. In order to prevent the deleted content from being operated by other operators, in some embodiments of the disclosure, if the operation type of the current operation information indicates that the operation instruction is a delete operation, the current operation information and the historical operation information may be aggregated and displayed in the manner in FIG. 9. FIG. 9 is a flowchart illustrating a method for aggregating information, according to some embodiments of the disclosure.

As illustrated in FIG. 9, the method includes the following.

In block 601, current operation information corresponding to a current operation instruction of a task is obtained.

In block 602, historical operation information of the task is obtained.

In some embodiments, the actions in blocks 601 and 602 are similar to the actions in blocks 101 and 102 described above, so it will not be repeated herein.

In block 603, an operation object of the historical operation information is set to an invalid state in response that the operation object of the historical operation information is the same as the operation object of the current operation information.

In some embodiments, when the operation type of the current operation information is the delete operation, the operation object in each historical operation information of the task is determined. All the historical operation information whose operation objects are the same as the operation object of the current operation information may be obtained from the historical operation information.

For example, if the operator deletes an attachment, all the historical operation information whose operation objects are the attachment may be obtained from the historical operation information, such as historical operation information of uploading the attachment, historical operation information of modifying the attachment, and the like.

After obtaining all the historical operation information whose operation objects are the same as the operation object of the current operation information from the historical operation information, the operation object in the historical operation information whose operation object is the same as the operation object of the current operation information is set to the invalid state.

For example, in FIG. 4 "records the screen video" in the second operation information is crossed off, indicating that it is set to the invalid state.

In some embodiments of the disclosure, the operation type of the current operation information indicates that the current operation instruction is the delete operation. When aggregating and displaying the current operation information and the historical operation information based on the degree of matching between the current operation information and the historical operation information, the operation object of the historical operation information is set to the invalid state in response that the operation object of the historical operation information is the same as the operation object of the current operation information. Therefore, when the current operation information is the delete operation, the operation object of the delete operation in the historical operation information is set to the invalid state, so as to prevent the deleted operation object from continuing to be operated.

In practical applications, if the operation content includes a large number of characters, it may obviously occupy the more space on the page if it is displayed normally. In some embodiments of the disclosure, after aggregating and displaying the current operation information and the historical operation information, it is determined whether a number of characters included in operation content of the current operation information is greater than a threshold. If the number of characters included in the operation content of the current operation information is greater than the threshold, it indicates that the operation content is long, and a part of the operation content of the current operation information is hidden, and a second preset scaling/expanding control is used to replace the hidden part of the operation content.

The second preset operation content control is used to hide or display the part of the operation content. The hidden operation content may be characters remaining except for the threshold number of characters in the operation content. Of course, the number of characters in the displayed operation content may also be greater than the threshold, or less than the threshold, which may be determined based on needs.

For the hidden part of the operation content, when displayed, it may be displayed as "hidden XXX", where XXX represents the hidden content. Moreover, the characters may also be displayed in different colors.

For example, if the number of characters in the current operation information is 30, which is greater than the threshold 15, the first 15 characters in the operation content may be displayed, and the last 15 characters may be hidden.

Figure 10:
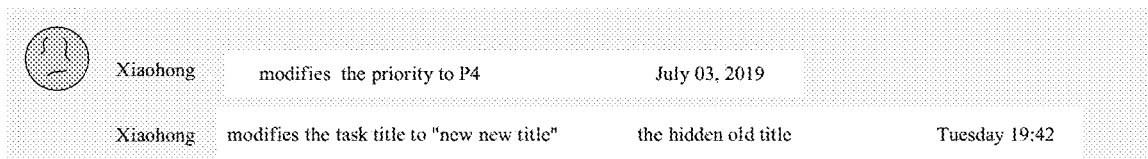
FIG. 10 is a schematic diagram illustrating displaying operation information, according to some embodiments of the disclosure.

If the operation type of the current operation information is an editing operation, when the corresponding operation content contains many characters, the part of the operation content may be hidden. FIG. 10 is a schematic diagram illustrating displaying operation information, according to some embodiments of the disclosure. In FIG. 10, the hidden old task title in the second historical operation information is displayed as "the hidden old title".

If the operation type of the current operation information is a comment operation, when the corresponding operation content contains many characters, the part of the operation content may be hidden. In other words, when the content of the comment is more, the part of the content of the comment may be hidden. In detail, when the number of characters in the content of the comment is greater than the threshold, the part of the content of the comment may be hidden. More specifically, the threshold number of characters in the content of the comment may be kept to be displayed, and the remaining characters may be hidden.

In some embodiments of the disclosure, after the abovementioned aggregating and displaying the current operation information and the historical operation information, if the number of characters in the operation content of the current operation information is greater than the threshold, the part of the operation content of the current operation information is hidden. Therefore, when the operation content of the current operation information is long, the part of the operation content is hidden, thereby reducing the space occupation of the page and improving the space utilization rate of the page.

In order not to affect the user to view the complete operation content, in some embodiments of the disclosure, after hiding the part of the operation content of the current operation information, complete operation content of the current operation information is displayed in response to monitoring a second display instruction for displaying the part of the operation content on a page for displaying operation information of the task.

That is, when the part of the operation content of the certain operation information is hidden, if the operator subsequently triggers the corresponding scaling/expanding control, the page may display the complete operation content of the operation information.

The complete operation content may include characters, pictures, hyperlinks, and the like. For example, if the hidden content also includes pictures, hyperlinks, etc., they may also be displayed.

Figure 11:
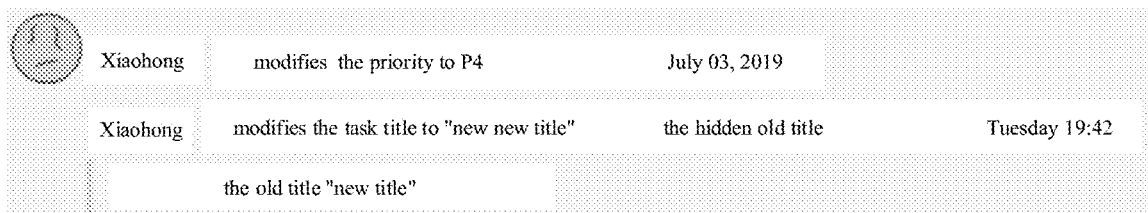
FIG. 11 is a schematic diagram illustrating displaying operation information, according to some embodiments of the disclosure.

FIG. 11 is a schematic diagram illustrating displaying operation information, according to some embodiments of the disclosure. In FIG. 11, when the "the hidden old title" is triggered, it shows that "the old title is new Title". Thus, the complete operation content of the second operation information is displayed on the page.

In some embodiments of the disclosure, after hiding the part of the operation content of the current operation information, the complete operation content of the current operation information is displayed in response to monitoring the second display instruction for displaying the part of the operation content on the page for displaying operation information of the task. Therefore, the hidden operation content may be displayed through the display instruction, that is, the complete operation content of the operation information is displayed, thereby ensuring that the operator may view the complete operation content while improving the space utilization rate of the page.

In practical applications, because the task cycle is usually relatively long, sometimes lasting several months, the amount of generated operation information is also quite large. When a user wants to find the certain operation information, it takes a long period of time. Based on this, in some embodiments of the disclosure, if the historical operation information is previous operation information corresponding to a previous operation instruction, the current operation information and the historical operation information are aggregated and displayed based on the degree of matching between the current operation information and the historical operation information, and a duration located by an operation moment of the current operation information is determined.

The duration may be divided by month or week, etc., which may be determined based on needs.

A segmentation indicator is inserted between the current operation information and the previous operation information in response that a duration located by an operation moment of the current operation information is different from a duration located by an operation moment of the previous operation information.

The previous operation information is historical operation information with the latest operation moment among all the historical operation information of the task. The segmentation identifier may be a horizontal line, a wavy line, etc., or other segmentation identifiers.

When a page for displaying dynamically messages of the task is displayed, the current operation information may be separated from the historical operation information in the duration located by the operation moment of the previous operation information by the segmentation identifier.

For example, if the duration is divided by month, the operation information whose operation moment in the same month may be put together, and the operation information in different months may be separated by the horizontal lines. It is convenient for the operator to view and find the operation information.

FIG. 12 is a schematic diagram illustrating displaying operation information, according to some embodiments of the disclosure. In FIG. 12, the operation information whose operation moment belongs to July 2019 on the display page, is separated from the operation information whose operation moment belongs to August 2019, by a horizontal line; and the operation information whose operation moment belongs to August 2019, is separated from the operation information whose operation moment belongs to September 2019, by a horizontal line.

In some embodiments of the disclosure, the historical operation information is the previous operation information corresponding to the previous operation instruction. When aggregating and displaying the current operation information and the historical operation information based on the degree of matching between the current operation information and the historical operation information, the segmentation indicator is inserted between the current operation information and the previous operation information in response that the duration located by the operation moment of the current operation information is different from the duration located by the operation moment of the previous operation information. Therefore, when the operation moment of the current operation information and the operation moment of the most recent historical operation information do not belong to the same duration, the segmentation indicator is inserted between the two to display the operation information in partitions, which may help the user quickly locate the operation information within the certain duration.

FIG. 13 is a block diagram illustrating an apparatus for aggregating information, according to some embodiments of the disclosure. As illustrated in FIG. 13, the apparatus 700 include a generating module 710, an obtaining module 720, and an aggregating and displaying module 730.

The generating module 710 is configured to obtain current operation information corresponding to a current operation instruction of a task.

The obtaining module 720 is configured to obtain historical operation information of the task.

The aggregating and displaying module 730 is configured to aggregate and display the current operation information and the historical operation information based on a degree of matching between the current operation information and the historical operation information.

In some embodiments of the disclosure, the historical operation information is previous operation information corresponding to a previous operation instruction, and the aggregating and displaying module 730 is further configured to: aggregate and display the current operation information and the previous operation information in response that an operator identifier of the previous operation information is the same as an operator identifier of the current operation information.

In some embodiments of the disclosure, in response that the operator identifier of the previous operation information is the same as the operator identifier of the current operation information, the aggregating and displaying module 730 is further configured to: replace the previous operation information with the current operation information, in response that the operator identifier of the previous operation information is the same as the operator identifier of the current operation information, an operation type of the previous operation information and an operation type of the current operation information both are editing operations, and an operation object of the previous operation information is the same as an operation object of the current operation information.

In some embodiments of the disclosure, in response that the operator identifier of the previous operation information is the same as the operator identifier of the current operation information, the aggregating and displaying module 730 is further configured to: hide the operator identifier of the current operation information, display the current operation information by reducing a size of characters in the current operation information, and/or adjust a color of characters in the current operation information, in response that the operator identifier of the previous operation information is the same as the operator identifier of the current operation information, an operation type of the previous operation information and an operation type of the current operation information both are editing operations, and an operation object of the previous operation information is different with an operation object of the current operation information.

In some embodiments of the disclosure, in response that the operator identifier of the previous operation information is the same as the operator identifier of the current operation information, the aggregating and displaying module 730 is further configured to: hide the operator identifier of the current operation information, in response that the operator identifier of the previous operation information is the same as the operator identifier of the current operation information, and an operation type of the previous operation information is different with an operation type of the current operation information.

In some embodiments of the disclosure, an operation type of the current operation information indicates that a current operation is an editing operation, and the obtaining module 720 is further configured to: obtain M consecutive pieces of historical operation information, starting from an operation moment of the current operation information, from the historical operation information of the task, where M is a positive integer greater than or equal to 2. The aggregating and displaying module 730 is further configured to: hide at least two consecutive pieces of historical operation information in the M consecutive pieces of historical operation information, in response that operation types of the M consecutive pieces of historical operation information and an operation type of the current operation information are all editing operations, and none of the M consecutive pieces of historical operation information is hidden.

In some embodiments of the disclosure, the aggregating and displaying module 730 is further configured to: display the at least two consecutive pieces of historical operation information that are hidden, in response to monitoring a first display instruction for displaying hidden information on a page for displaying operation information of the task.

In some embodiments of the disclosure, the aggregating and displaying module 730 is further configured to: hide a piece of historical operation information next to at least one piece of historical operation information whose display state is a hidden state, in response that the operation types of the M consecutive pieces of historical operation information and the operation type of the current operation information are all editing operations, and the M consecutive pieces of historical operation information at least comprise the at least one piece of historical operation information whose display state is the hidden state.

In some embodiments of the disclosure, the aggregating and displaying module 730 is further configured to: display the historical operation information and the current operation information in a time order of operation moments, in response that the operation type of at least one piece of historical operation information in the M consecutive pieces of historical operation information is different from the operation type of the current operation information.

In some embodiments of the disclosure, an operation type of the current operation information indicates that a current operation is a delete operation, and the aggregating and displaying module 730 is further configured to: set an operation object of the historical operation information to an invalid state in response that the operation object of the historical operation information is the same as the operation object of the current operation information.

In some embodiments of the disclosure, the apparatus further includes a hiding module. The hiding module is configured to hide a part of operation content of the current operation information in response that a number of characters included in the operation content of the current operation information is greater than a threshold.

In some embodiments of the disclosure, the aggregating and displaying module 730 is further configured to: display complete operation content of the current operation information in response to monitoring a second display instruction for displaying the part of the operation content on a page for displaying operation information of the task.

In some embodiments of the disclosure, the historical operation information is previous operation information corresponding to a previous operation instruction, and the aggregating and displaying module 730 is further configured to: insert a segmentation indicator between the current operation information and the previous operation information in response that a duration located by an operation moment of the current operation information is different from a duration located by an operation moment of the previous operation information.

In actual use, the apparatus for aggregating information provided by some embodiments of the disclosure may be configured in any electronic device, such as a mobile phone, a palmtop computer, to execute the aforementioned method provided by some embodiments of the disclosure. Therefore, with regard to the apparatus in the foregoing embodiments, the specific manner in which each module performs operations has been described in detail in the embodiments of the method, and will not be elaborated herein.

With the apparatus for aggregating information provided in some embodiments of the disclosure, the current operation instruction for any task may be executed and the current operation information corresponding to the operation instruction is generated. The historical operation information of any task is obtained. The current operation information and the historical operation information are aggregated and displayed based on the degree of matching between the current operation information and the historical operation information. As a result, the current operation information and the historical operation information are aggregated and displayed based on the degree of matching between the current operation information and the historical operation information, so that the current operation information and historical operation information of the task are aggregated for display. When the user is viewing the operation information of the task, there is no need to switch pages back and forth, which improves the efficiency of reading operation information.

Figure 14:
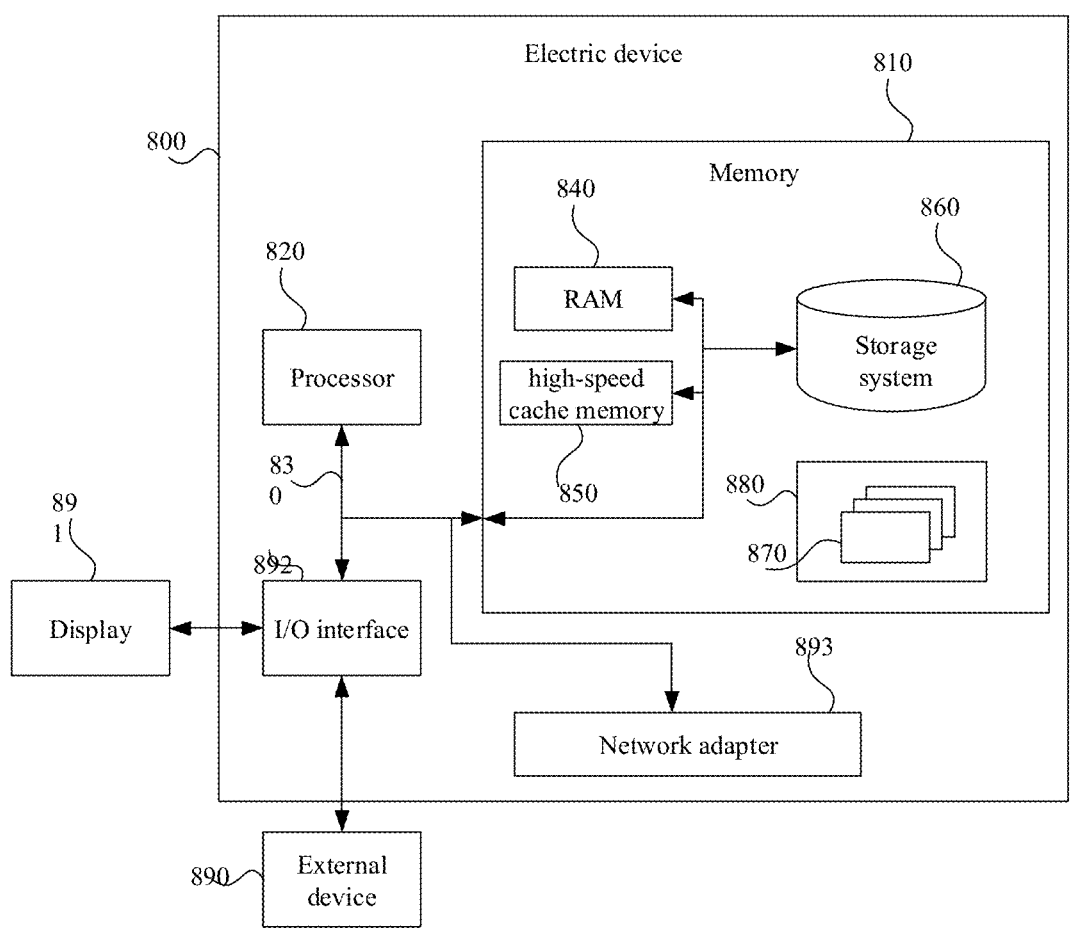
FIG. 14 is a block diagram illustrating an electronic device, according to some embodiments of the disclosure.

FIG. 14 is a block diagram illustrating an electronic device 800 for implementing a method for aggregating information, according to some embodiments of the disclosure.

As illustrated in FIG. 14, the electronic device 800 includes a memory 810, a processor 820, and a bus 830 connecting different system components (including the memory 810 and the processor 820). The memory 810 is configured to store a computer program. The processor 820 is configured to execute the computer program to perform the method for aggregating information according to some embodiments of the disclosure.

The bus 830 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standard association (VESA) local bus, and a peripheral component interconnect (PCI) bus.

Typically, the electronic device 800 may include multiple kinds of computer-readable media. These media may be any storage media accessible by the electronic device 800, including transitory or non-transitory storage medium and movable or unmovable storage medium.

The memory 810 may include a computer-readable medium in a form of volatile memory, such as a random-access memory (RAM) 840 and/or a high-speed cache memory 850. The electronic device 800 may further include other transitory/non-transitory storage media and movable/unmovable storage media. In way of example only, the storage system 860 may be used to read and write non-removable, non-volatile magnetic media (not shown in the figure, commonly referred to as "hard disk drives"). Although not illustrated in FIG. 14, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 830 via one or more data medium interfaces. The memory 810 may include at least one program product, which has a set of (for example at least one) program modules configured to perform the functions of embodiments of the present disclosure.

A program/application 880 with a set of (at least one) program modules 870 may be stored in memory 810, the program modules 870 may include, but not limit to, an operating system, one or more application programs, other program modules and program data, and any one or combination of above examples may include an implementation in a network environment. The program modules 870 are generally configured to implement functions and/or methods described in embodiments of the present disclosure.

The electronic device 800 may also communicate with one or more external devices 890 (e.g., a keyboard, a pointing device, a display 891, and etc.) and may also communicate with one or more devices that enables a user to interact with the computer system/server 800, and/or any device (e.g., a network card, a modem, and etc.) that enables the computer system/server 800 to communicate with one or more other computing devices. This kind of communication can be achieved by the input/output (I/O) interface 892. In addition, the electronic device 800 may be connected to and communicate with one or more networks such as a local area network (LAN), a wide area network (WAN) and/or a public network such as the Internet through a network adapter 893. As shown in FIG. 14, the network adapter 893 communicates with other modules of the electronic device 800 over bus 830. It should be understood that although not shown in the figure, other hardware and/or software modules may be used in combination with the electronic device 800, which including, but not limited to, microcode, device drivers, redundant processing units, external disk drive arrays, RAID systems, tape drives, as well as data backup storage systems and the like.

The processor 820 can perform various functional applications and data processing by running programs stored in the memory 810, for example, to perform method provided by embodiments of the present disclosure.

It should be noted that, for the implementation process and technical principle of the electronic device of some embodiments, reference should be made to the foregoing explanation of the method in some embodiments of the disclosure, which may not be repeated herein.

With the electronic device provided by the embodiments of the disclosure, the method described above may be executed, the current operation instruction for any task may be executed and the current operation information corresponding to the operation instruction is generated. The historical operation information of any task is obtained. The current operation information and the historical operation information are aggregated and displayed based on the degree of matching between the current operation information and the historical operation information. As a result, the current operation information and the historical operation information are aggregated and displayed based on the degree of matching between the current operation information and the historical operation information, so that the current operation information and historical operation information of the task are aggregated for display. When the user is viewing the operation information of the task, there is no need to switch pages back and forth, which improves the efficiency of reading operation information.

In order to implement the above-mentioned embodiments, the disclosure also proposes a storage medium.

When instructions in the storage medium are executed by the processor of the electronic device, the electronic device may execute the aforementioned method.

In order to implement the above-mentioned embodiments, the disclosure also proposes a computer program product. When the computer program is executed by the processor of the electronic device, the electronic device may execute the aforementioned method.

Those skilled in the art may easily think of other embodiments of the disclosure after considering the description and practicing the disclosure disclosed herein. The disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The description and the embodiments are only to be regarded as exemplary, and the true scope and spirit of the disclosure are pointed out by the following claims.

It should be understood that the disclosure is not limited to the precise structure that has been described above and shown in the drawings, and various modifications and changes may be made without departing from its scope. The scope of the disclosure is only limited by the appended claims.

What is claimed is:

1. A method for aggregating information related to various tasks in a project management tool, wherein the project management tool is a tool for managing various projects and each project is divided into tasks, the method comprising:
   performing a current operation on a task and generating current operation information corresponding to the current operation, wherein the current operation information comprises at least one of: an operator identifier, an operation object, an operation type, an operation moment and operation content;
   obtaining historical operation information of the task, wherein the historical operation information comprises previous operation information corresponding to a previous operation; and
   aggregating and displaying the current operation information and the historical operation information based on a degree of matching between the current operation information and the historical operation information, wherein aggregating and displaying the current operation information and the historical operation information based on the degree of matching between the current operation information and the historical operation information comprises: replacing the historical operation information with the current operation information, in response that an operator identifier of the historical operation information is the same as the operator identifier of the current operation information, an operation type of the historical operation information and the operation type of the current operation information both are editing operations and an operation object of the historical operation information is the same as the operation object of the current operation information.

2. The method as claimed in claim 1, further comprising:
   hiding the operator identifier of the current operation information, in response that the operator identifier of the historical operation information is the same as the operator identifier of the current operation information and the operation type of the historical operation information is different with the operation type of the current operation information.

3. The method as claimed in claim 1,
wherein when the operation type of the current operation information indicates that the current operation information is the editing operation, obtaining the historical operation information of the task comprises:
obtaining, starting from the operation moment of the current operation information, M consecutive pieces of historical operation information from the historical operation information of the task, where M is a positive integer greater than or equal to 2;
wherein aggregating and displaying the current operation information and the historical operation information based on the degree of matching between the current operation information and the historical operation information comprises:
hiding at least two consecutive pieces of historical operation information in the M consecutive pieces of historical operation information, in response that operation types of the M consecutive pieces of historical operation information and the operation type of the current operation information are all editing operations, and none of the M consecutive pieces of historical operation information is hidden.

4. The method as claimed in claim 3, after hiding at least two consecutive pieces of historical operation information in the M consecutive pieces of historical operation information, further comprising:
displaying the at least two consecutive pieces of historical operation information that are hidden, in response to monitoring a first instruction for displaying hidden information on a page for displaying information of the task.

5. The method as claimed in claim 3, wherein aggregating and displaying the current operation information and the historical operation information based on the degree of matching between the current operation information and the historical operation information comprises:
hiding a piece of historical operation information next to at least one piece of historical operation information whose display state is a hidden state, in response that the operation types of the M consecutive pieces of historical operation information and the operation type of the current operation information are all editing operations, and the M consecutive pieces of historical operation information comprise the at least one piece of historical operation information whose display state is the hidden state.

6. The method as claimed in claim 3, wherein aggregating and displaying the current operation information and the historical operation information based on the degree of matching between the current operation information and the historical operation information comprises:
displaying the historical operation information and the current operation information in a time order of operation moments, in response that the operation type of at least one piece of historical operation information in the M consecutive pieces of historical operation information is different from the operation type of the current operation information.

7. The method as claimed in claim 1, wherein when the operation type of the current operation indicates that the current operation is a delete operation, and displaying the current operation information and the historical operation information based on the degree of matching between the current operation information and the historical operation information comprises:
setting an operation object of the historical operation information to an invalid state in response that the operation object of the historical operation information is the same as the operation object of the current operation information.

8. The method as claimed in claim 1, after aggregating and displaying the current operation information and the historical operation information, further comprising:
hiding a part of the operation content of the current operation information in response that a number of characters included in the operation content of the current operation information is greater than a threshold.

9. The method as claimed in claim 8, after hiding the part of the operation content of the current operation information, further comprising:
displaying complete operation content of the current operation information in response to monitoring a second instruction for displaying the part of the operation content on a page for displaying information of the task.

10. The method as claimed in claim 1, wherein when the historical operation information is the previous operation information corresponding to the previous operation, aggregating and displaying the current operation information and the historical operation information based on the degree of matching between the current operation information and the historical operation information comprises:
inserting a segmentation indicator between the current operation information and the previous operation information in response that a duration located by the operation moment of the current operation information is different from a duration located by an operation moment of the historical operation information.

11. The method as claimed in claim 1, further comprising:
hiding the operator identifier of the current operation information, displaying the current operation information by reducing a size of characters in the current operation information, and/or adjusting a color of characters in the current operation information, in response to the operator identifier of the historical operation information is the same as the operator identifier of the current operation information, the operation type of the historical operation information and the operation type of the current operation information both are editing operations and the operation object of the historical operation information is different with the operation object of the current operation information.

12. An electronic device, comprising:
a processor; and
a memory for storing instructions executable by the processor;
wherein the processor is configured to execute the instructions to perform the method for aggregating information related to various tasks in a project management tool, wherein the project management tool is a tool for managing various projects and each project is divided into tasks, the method comprising:
performing a current operation on a task and generating current operation information corresponding to the current operation, wherein the current operation information comprises at least one of: an operator identifier, an operation object, an operation type, an operation moment and operation content;

obtaining historical operation information of the task, wherein the historical operation information comprises previous operation information corresponding to a previous operation; and aggregating and displaying the current operation information and the historical operation information based on a degree of matching between the current operation information and the historical operation information, wherein aggregating and displaying the current operation information and the historical operation information based on the degree of matching between the current operation information and the historical operation information comprises: replacing the historical operation information with the current operation information, in response that an operator identifier of the historical operation information is the same as the operator identifier of the current operation information, an operation type of the historical operation information and the operation type of the current operation information both are editing operations and an operation object of the historical operation information is the same as the operation object of the current operation information.

13. A non-transitory computer-readable storage medium having stored therein instructions that, when executed by a processor of an electronic device, causes the electronic device to perform the method for aggregating information related to various tasks in a project management tool, wherein the project management tool is a tool for managing various projects and each project is divided into tasks, the method comprising:

performing a current operation on a task and generating current operation information corresponding to the current operation, wherein the current operation information comprises at least one of: an operator identifier, an operation object, an operation type, an operation moment and operation content;

obtaining historical operation information of the task, wherein the historical operation information comprises previous operation information corresponding to a previous operation; and aggregating and displaying the current operation information and the historical operation information based on a degree of matching between the current operation information and the historical operation information, wherein aggregating and displaying the current operation information and the historical operation information based on the degree of matching between the current operation information and the historical operation information comprises: replacing the historical operation information with the current operation information, in response that an operator identifier of the historical operation information is the same as the operator identifier of the current operation information, an operation type of the historical operation information and the operation type of the current operation information both are editing operations and an operation object of the historical operation information is the same as the operation object of the current operation information.

14. An apparatus for aggregating information related to various tasks in a project management tool, wherein the project management tool is a tool for managing various projects and each project is divided into tasks, the apparatus comprising:
a processor; and a non-transitory computer readable storage medium storing a plurality of instructions that, when executed by the processor, cause the terminal device to perform the following modules:

a generating module, configured to perform a current operation on a task and generate current operation information corresponding to the current operation, wherein the current operation information comprises at least one of: an operator identifier, an operation object, an operation type, an operation moment and operation content;

an obtaining module, configured to obtain historical operation information of the task, wherein the historical operation information comprises previous operation information corresponding to a previous operation; and a aggregating and displaying module, configured to aggregate and display the current operation information and the historical operation information based on a degree of matching between the current operation information and the historical operation information, wherein aggregating and displaying the current operation information and the historical operation information based on the degree of matching between the current operation information and the historical operation information comprises: replacing the historical operation information with the current operation information, in response that an operator identifier of the historical operation information is the same as the operator identifier of the current operation information, an operation type of the historical operation information and the operation type of the current operation information both are editing operations and an operation object of the historical operation information is the same as the operation object of the current operation information.

15. The apparatus as claimed in claim 14, wherein the aggregating and displaying module is configured to:
hide the operator identifier of the current operation information, display the current operation information by reducing a size of characters in the current operation information, and/or adjust a color of characters in the current operation information, in response to the operator identifier of the historical operation information is the same as the operator identifier of the current operation information, the operation type of the historical operation information and the operation type of the current operation information both are editing operations and the operation object of the historical operation information is different with the operation object of the current operation information.

16. The apparatus as claimed in claim 14, wherein the aggregating and displaying module is configured to:
hide the operator identifier of the current operation information, in response that the operator identifier of the historical operation information is the same as the operator identifier of the current operation information and the operation type of the historical operation information is different with the operation type of the current operation information.

17. The apparatus as claimed in claim 14, wherein when the operation type of the current operation information indicates that the current operation information is the editing operation, the obtaining module is configured to:
obtain, starting from the operation moment of the current operation information, M consecutive pieces of historical operation information from the historical operation information of the task, where M is a positive integer greater than or equal to 2;

the aggregating and displaying module is configured to:
hide at least two consecutive pieces of historical operation information in the M consecutive pieces of historical operation information, in response that operation types of the M consecutive pieces of historical operation information and the operation type of the current operation information are all editing operations, and none of the M consecutive pieces of historical operation information is hidden.

18. The apparatus as claimed in claim 17, wherein the aggregating and displaying module is configured to:
display the at least two consecutive pieces of historical operation information that are hidden, in response to monitoring a first instruction for displaying hidden information on a page for displaying information of the task.

19. The apparatus as claimed in claim 17, wherein the aggregating and displaying module is configured to:
hide a piece of historical operation information next to at least one piece of historical operation information whose display state is a hidden state, in response that the operation types of the M consecutive pieces of historical operation information and the operation type of the current operation information are all editing operations, and the M consecutive pieces of historical operation information comprise the at least one piece of historical operation information whose display state is the hidden state.

20. The apparatus as claimed in claim 17, wherein the aggregating and displaying module is configured to:
display the historical operation information and the current operation information in a time order of operation moments, in response that the operation type of at least one piece of historical operation information in the M consecutive pieces of historical operation information is different from the operation type of the current operation information.

21. The apparatus as claimed in claim 14, wherein when the operation type of the current operation indicates that the current operation is a delete operation, the aggregating and displaying module is configured to:
set an operation object of the historical operation information to an invalid state in response that the operation object of the historical operation information is the same as the operation object of the current operation information.

22. The apparatus as claimed in claim 14, wherein the non-transitory computer readable storage medium storing the plurality of instructions that, when executed by the processor, cause the terminal device to perform the following module:
a hiding module, configured to hide a part of the operation content of the current operation information in response that a number of characters included in the operation content of the current operation information is greater than a threshold.

23. The apparatus as claimed in claim 22, wherein the aggregating and displaying module is configured to:
display complete operation content of the current operation information in response to monitoring a second instruction for displaying the part of the operation content on a page for displaying information of the task.

24. The apparatus as claimed in claim 14, wherein when the historical operation information is the previous operation information corresponding to the previous operation, the aggregating and displaying module is configured to:
insert a segmentation indicator between the current operation information and the previous operation information in response that a duration located by the operation moment of the current operation information is different from a duration located by an operation moment of the historical operation information.

* * * * *